June 30, 1942.  R. J. GALES  2,288,564
METHOD OF MAKING CAGES FOR ROLLER BEARINGS
Filed June 25, 1940
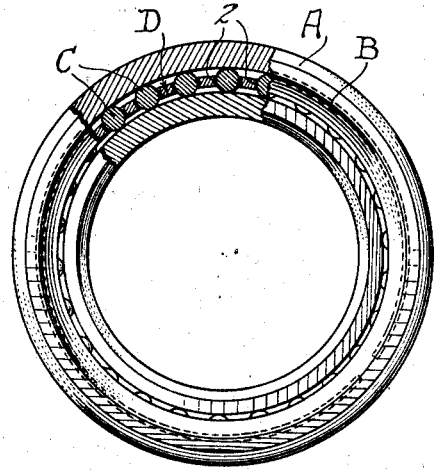
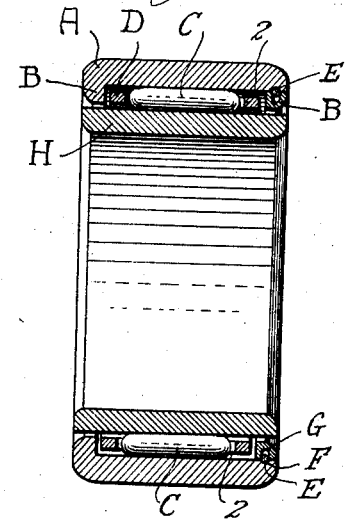
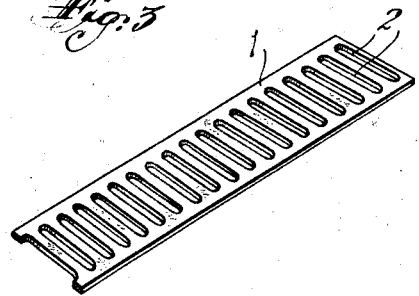
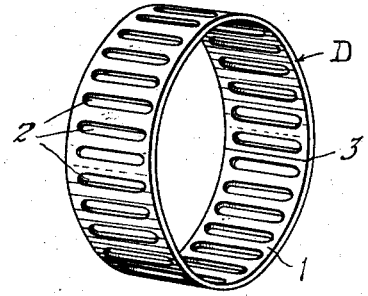
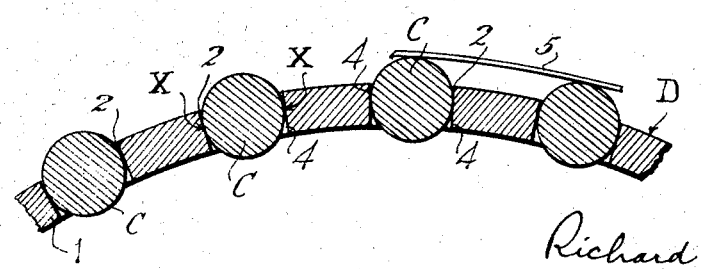
INVENTOR
Richard J. Gales,
BY
Harry B. Rook,
ATTORNEY Patented June 30, 1942

2,288,564

UNITED STATES PATENT OFFICE 2,288,564

METHOD OF MAKING CAGES FOR ROLLER BEARINGS

Richard J. Gales, West Caldwell, N. J., assignor to Orange Roller Bearing Co. Inc., a corporation of New Jersey Application June 25, 1940, Serial No. 342,238

3 Claims. (Cl. 29—148.4)

This invention relates specifically to roller bearings of the types which include an outer race ring or a race ring having an interior race, a plurality of rollers within the race ring, and a holder or cage for the rollers, one object of the invention being to provide a novel and improved cage or holder for the rollers that shall be simple and inexpensive in construction, can be economically manufactured, and shall effectually hold the rollers within the race ring.

Another object is to provide a novel and improved method of making a roller cage by simple stamping and bending operations so as to eliminate the necessity for milling or other precision machine cutting operations, so that the cost of production of the holder shall be substantially less than the cost of production of known cages of the same general character.

Other objects, advantages and results of the invention will appear from the following description in conjunction with the accompanying drawing in which Figure 1 is an end elevational view of a roller bearing embodying my invention, partially broken away and shown in section.

Figure 2 is a vertical longitudinal sectional view through the bearing on the line 2—2 of Figure 1.

Figure 3 is a fragmentary perspective view of the blank for the roller holder.

Figure 4 is a perspective view of the completed roller holder with the rollers removed, and Figure 5 is an enlarged fragmentary transverse vertical sectional view through the roller cage and a few of the rollers.

For the purpose of illustrating the invention, I have shown it in conjunction with the generally known type of roller bearing which includes an outer race ring A having retainer rings B at its ends to hold the rollers C and roller holder or cage D against axial displacement with respect to the race ring. As shown, at least one of these retainer rings B is separate from the race ring A and is secured to the race ring by a wire locking ring E disposed in grooves F and G in the race ring A and the retainer with at least portions of the locking ring E completely crossing or bridging the joint between the circumferentially contacting surfaces of the race ring A and the retainer ring B.

The roller cage D is formed of a strip 1 of suitable material of such length that when it is bent into circular form, the cage D will loosely fit within the inner race of the race ring A. The strip 1 is of a thickness less than the diameter of the rollers C and its opposite faces are flat and parallel to each other. A plurality of transverse slots 2, preferably equi-distantly spaced, are stamped in the strip 1, one to receive each of the rollers C, said slots being of a width substantially equal to the diameter of the rollers throughout the thickness of the strip and of a length slightly greater than the length of the rollers. As shown, the side walls of each slot are parallel to each other throughout the thickness of the strip and are perpendicular to the opposite faces of the strip.

After the strip has been punched to form the slots 2, it is bent around a mandrel into exactly circular form as shown in Figures 1 and 4, and the ends of the strip 1 are secured together in abutting relation as by brazing at 3. During the bending operation, the side walls 4 of each slot are caused to converge inwardly toward the axis of the cage D as clearly shown in Figure 5 so that said side walls are approximately radial to the cage ring. In effect, the outer circumference of the cage ring D is slightly stretched, while the inner circumference is slightly contracted so that the edges of the slots 2 at the outer circumference of the cage ring are spaced apart distances somewhat greater than the diameter of the rollers C, while the edges of the slots at the inner circumference of the ring A are spaced apart distances less than the diameter of the rollers C. In other words, the side walls of the slots are approximately in planes radial to the axis of the ring. Accordingly, when the rollers C are inserted in the slots from the outer circumference of the cage ring D, the peripheries of the rollers engage the side walls of the slots at points intermediate the thickness of the strip of which the cage ring D is formed, as clearly shown at X in Figure 5.

In assembling the cage ring D and rollers C into the race ring A, the rollers are set into the slots 2 from the outer circumference of the cage ring D and temporarily held in position by a suitable fixture or encircling band 5, whereupon the cage ring D is slipped coaxially into the race ring A at the end thereof in which the removable retainer ring is to be fitted, the fixture or band 5 being removed as the cage ring D enters the race ring A. Then the removable retainer ring B is inserted so as to hold the cage ring D and rollers C against axial displacement from the race ring A.

With this construction, it will be observed that the rollers C will be held against displacement radially inwardly of the race ring A and free for contact with the inner surface of the race ring A beyond the outer circumference of the cage ring D and free for contact with a shaft or an inner race ring H inside the inner circumference of the cage ring D. The rollers C are loosely held in the slots 2 and the cage ring D in effect floats during operation of the bearing so as to hold the rollers C in properly spaced relation and with their axes parallel to the axis of the race ring A. The ends of the slots 2 serve as stops to limit longitudinal movement of the rollers C, while the retainer rings B limit movement of the cage ring D axially of the bearing.

It will thus be seen that my invention provides a simple and inexpensive roller cage which will permanently hold rollers in the outer race ring, and restrain the rollers against cocking or misalignment with respect to the race ring.

I am aware of such constructions as shown in Patents Nos. 1,907,421 and 1,772,346, and do not wish to be understood to be attempting to claim such structures. However, while I have shown a now preferred embodiment of my invention, it should be understood that modifications and changes may be made in the details of construction and use of the invention without departing from the spirit or scope thereof.

Having thus described my invention, what I claim is:

1. The method of making a cage for roller bearings, consisting in punching in a flat strip of metal that has a thickness less than the diameter of the rollers to be held by the cage and whose opposite faces are parallel to each other, a plurality of slots each of which is of uniform width approximately equal to the diameter of such roller throughout the thickness of the strip and has its side walls perpendicular to the opposite faces of the strip, and then bending said punched strip into a circular ring so that the widths of each slot at the outer and inner peripheries of the ring are greater and less respectively than the diameter of the roller.

2. The method of making a cage for the rollers of a roller bearing, which consists in punching in a flat strip of metal that has a thickness less than the diameter of the rollers to be held by the cage and whose opposite faces are parallel to each other, a plurality of slots each of which has a width approximately equal to the diameter of such rollers and has side walls perpendicular throughout their widths to the opposite faces of the strip, then bending the strip into a circular ring with the ends of the strip in abutting relation to each other so that the side walls of said slots are in planes approximately radial to the axis of the ring, and inserting a roller in each slot from the outer circumference of the ring.

3. The method of making a cage for the rollers of a roller bearing, which consists in punching a strip of bendable sheet material to form a longitudinal row of elongate slots each of which extends transversely of the strip and whose side walls are parallel to each other throughout the thickness of the strip and spaced apart a distance approximately equal to the diameter of the rollers to be held in the cage, then bending the strip into a circular ring so that the widths of each slot at the outer and inner peripheries of the ring are greater and less respectively than the diameter of the roller, securing the ends of the strip together, and inserting a roller in each slot from the outer circumference of the ring.

RICHARD J. GALES.